-572 S?
24/87 03 RE 32,427

United States Patent [19]

Gregor et al.

[11] E Patent Number: Re. 32,427

[45] Reissued Date of Patent: May 26, 1987

[54] AMORPHOUS ANTIPILFERAGE MARKER

[76] Inventors: John A. Gregor, 75 E. Lewis St., Basking Ridge, N.J. 07920; Gregory J. Sellers, 106 E. Glen Rd., Denville, N.J. 07834

[21] Appl. No.: 740,489

[22] Filed: Jun. 3, 1985

Related U.S. Patent Documents

Reissue of:

[64] Patent No.: 4,298,862
Issued: Nov. 3, 1981
Appl. No.: 32,196
Filed: Apr. 23, 1979

[51] Int. Cl.[4] ..... G08B 13/26

[52] U.S. Cl. ..... 340/572; 335/296; 340/551

[58] Field of Search ..... 340/572, 551; 335/296; 324/201, 260

[56] References Cited

U.S. PATENT DOCUMENTS

| | | | |
|---|---|---|---|
| 3,820,104 | 6/1974 | Fearon | 340/572 |
| 3,856,513 | 12/1974 | Chen et al. | 75/123 B |
| 4,036,638 | 7/1977 | Ray et al. | 75/123 B |
| 4,074,249 | 2/1978 | Minasy | 340/572 |
| 4,075,618 | 2/1978 | Montean | 340/572 |

OTHER PUBLICATIONS

O'Handley, R. C., et al., "Ferromagnetic Properties of Some New Metallic Glasses," *Applied Physics Letters*, XXIX, 6, pp. 230-232.

Hilzinger, H. R. et al, "Amorphous Ferromagnetic Materials-Magnetic Fundamentals, Properties, & Applications," *Journal of Magnetism and Magnetic Materials*, IX (1978), pp. 191-199.

Fahlenbrach, "Techn Mitt. Krupp-Werksber.," 30, 149 (1972).

*Primary Examiner*—Glen R. Swann, III

[57] ABSTRACT

A magnetic theft detection system marker is adapted to generate magnetic fields at frequencies that (1) are harmonically related to an incident magnetic field applied within an interrogation zone and (2) have selected tones that provide the marker with signal identity. The marker is an elongated, ductile strip of amorphous ferromagnetic material that retains its signal identity after being flexed or bent.

22 Claims, 4 Drawing Figures

AMORPHOUS ANTIPILFERAGE MARKER

Matter enclosed in heavy brackets [ ] appears in the original patent but forms no part of this reissue specification; matter printed in italics indicates the additions made by reissue.

DESCRIPTION

BACKGROUND OF THE INVENTION

1. Field of the Invention

This invention relates to antipilferage systems and markers for use therein. More particularly, the invention provides a ductile, amorphous metal marker that enhances the sensitivity and reliability of the antipilferage system.

2. Description of the Prior Art

Theft of articles such as books, wearing apparel, appliances and the like from retail stores and state-funded institutions is a serious problem. The cost of replacing stolen articles and the impairment of services rendered by institutions such as libraries exceeds $6 billion annually and is increasing.

Systems employed to prevent theft of articles generally comprise a marker element secured to an object to be detected and instruments adapted to sense a signal produced by the marker upon passage thereof through an interrogation zone.

One of the major problems with such theft detection systems is the difficulty of preventing degradation of the marker signal. If the marker is broken or bent, the signal can be lost or altered in a manner that impairs its identifying characteristics. Such bending or breaking of the marker can occur inadvertently during manufacture of the marker and subsequent handling of merchandise by employees and customers, or purposely in connection with attempted theft of goods. The present invention is directed to overcoming the foregoing problems.

SUMMARY OF THE INVENTION

Briefly stated, the invention provides an amorphous ferromagnetic metal marker capable of producing identifying signal characteristics in the presence of an applied magnetic field. The marker resists breaking during manufacture and handling of merchandise to which it is secured, and retains its signal identity when flexed or bent.

In addition, the invention provides a magnetic detection system responsive to the presence within an interrogation zone of an article to which the marker is secured. The system has means for defining an interrogation zone. Means are provided for generating a magnetic field within the interrogation zone. An amorphous magnetic metal marker is secured to an article appointed for passage through the interrogation zone. The marker comprises an elongated, ductile strip of amorphous ferromagnetic metal material capable of producing magnetic fields at frequencies which are harmonics of the frequency of an incident field. Such frequencies have selected tones that provide the marker with signal identity. A detecting means is arranged to detect magnetic field variations at selected tones of the harmonics produced in the vicinity of the interrogation zone by the presence of the marker therewithin. The marker retains its signal identity after being flexed or bent. As a result, the theft detection system of the present invention is more reliable in operation than systems wherein signal degradation is effected by bending or flexing of the marker.

BRIEF DESCRIPTION OF THE DRAWINGS

The invention will be more fully understood and further advantages will become apparent when reference is made to the following detailed description of the preferred embodiment of the invention and the accompanying drawings in which.

DESCRIPTION OF THE PREFERRED EMBODIMENTS

Figure 1:
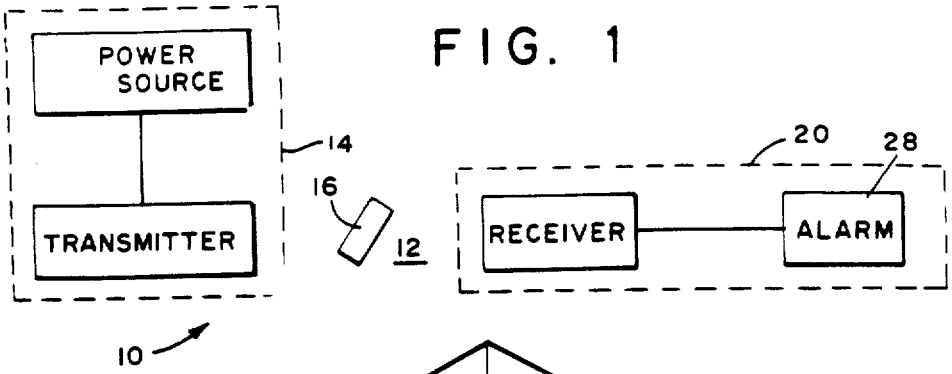
FIG. 1 is a block diagram of a magnetic theft detection system incorporating the present invention.
Figure 2:
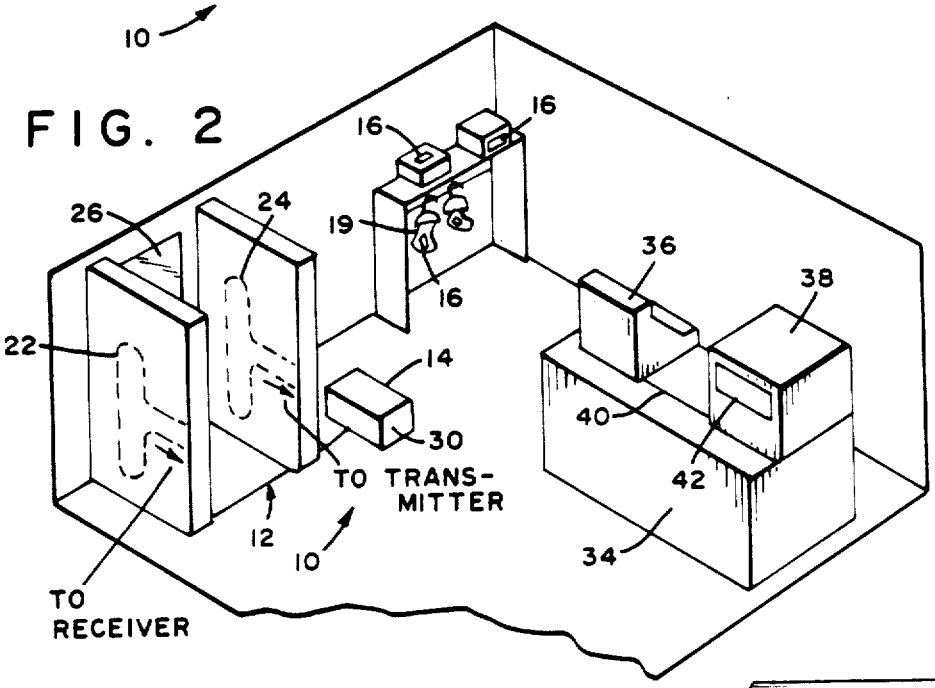
FIG. 2 is a diagrammatic illustration of a typical store installation of the system of FIG. 1.

Referring to FIGS. 1 and 2 of the drawings, there is shown a magnetic theft detection system 10 responsive to the presence of an article within an interrogation zone. The system 10 has means for defining an interrogation zone 12. A field generating means 14 is provided for generating a magnetic field within the interrogation zone 12. A marker 16 is secured to an article 19 appointed for passage through the interrogation zone 12. The marker is an elongated, ductile strip of amorphous, ferromagnetic metal capable of producing magnetic fields at frequencies which are harmonics of the frequency of an incident field. Such frequencies have selected tones that provide the marker with signal identity. A detecting means 20 is arranged to detect magnetic field variations at selected tones of the harmonics produced in the vicinity of the interrogation zone 12 by the presence of marker 16 therewithin.

Figure 3:
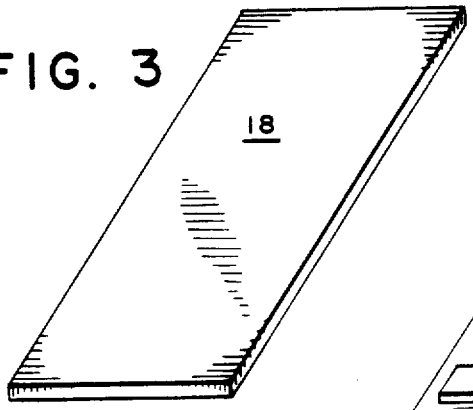
FIG. 3 is an isomeric view of a marker adapted for use in the system of FIG. 1.
Figure 4:
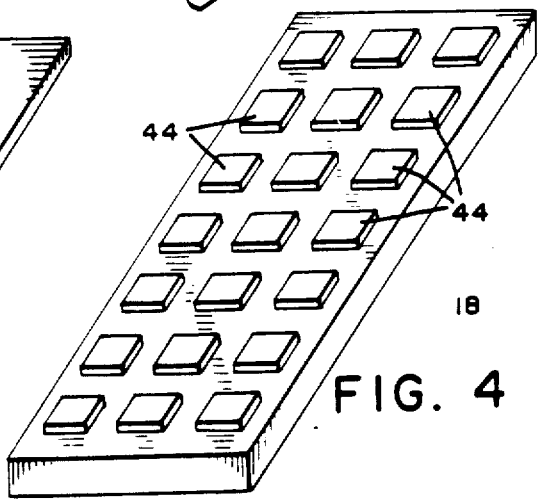
FIG. 4 is an isomeric view of a densensitizable marker adapted for use in the system of FIG. 1.

Typically, the system 10 includes a pair of coil units 22, 24 disposed on opposing sides of a path leading to the exit 26 of a store. Detection circuitry, including an alarm 28, is housed within a cabinet 30 located near the exit 26. Articles of merchandise 19 such as wearing apparel, appliances, books and the like are displayed within the store. Each of the articles 19 has secured thereto a marker 16 constructed in accordance with the present invention. The marker 16 includes an elongated, ductile amorphous ferromagnetic strip 18 (see FIGS. 3 and 4) that is normally in an activated mode. When marker 16 is in the activated mode, placement of an article 19 between coil units 22 and 24 of interrogation zone 12 will cause an alarm to be emitted from cabinet 30. In this manner, the system 10 prevents unauthorized removal of articles of merchandise 19 from the store.

Disposed on a checkout counter near cash register 36 is a deactivator system 38. The latter is electrically connected to cash register 36 by wire 40. Articles 19 that have been properly paid for are placed within an aperture 42 of deactivation system 38, whereupon a magnetic field similar to that produced by coil units 22 and 24 of interrogation zone 12 is applied to marker 16. The deactivation system 38 has detection circuitry adapted to activate a gaussing circuit in response to harmonic signals generated by marker 16. The gaussing circuit applies to marker 16 a high magnetic field that places the marker 16 in a deactivated mode. The article 19 carrying the deactivated marker 16 may then be carried through interrogation zone 12 without triggering the alarm 28 in cabinet 30.

The theft detection system circuitry with which the marker 16 is associated can be any system capable of (1) generating within an interrogation zone an incident magnetic field, and (2) detecting magnetic field variations at selected harmonic frequencies produced in the vicinity of the interrogation zone by the presence of the marker therewithin. Such systems typically include means for transmitting a varying electrical current from an oscillator and amplifier through conductive coils that form a frame antenna capable of developing a varying magnetic field. An example of such antenna arrangement is disclosed in French Pat. No. 763,681, published May 4, 1934, which description is incorporated herein by reference thereto.

In accordance with a preferred embodiment of the invention, an amorphous ferromagnetic metal marker is provided. The marker is in the form of an elongated, ductile strip having a composition consisting essentially of the formula $$[(Z_xT_{1-x})_mA_{1-m}]$$
$$(Z_xTb_{1-x})_mA_{1-m}$$

Z is at least one of iron and cobalt, Tb is selected from the group consisting of nickel, molybdenum, vanadium, chromium and copper and mixtures thereof. A is at least one of boron, phosphorus, carbon, silicon, nitrogen, germanium and aluminum, x ranges from about 20–100 atom percent, and [M] $m$ ranges from about 70–85 atom percent.

Examples of amorphous ferromagnetic marker compositions within the scope of the invention are set forth in Table I below:

TABLE 1

| | | Composition Percent | | | | | | |
|---|---|---|---|---|---|---|---|---|
| | | Fe | Co | Ni | Mo | B | P | Si |
| Fe—Ni—Mo—B | atom % | 40 | — | 40 | 2 | 18 | — | — |
| | weight % | 45 | — | 47 | 4 | 4 | — | — |
| Fe—Ni—P—B | atom % | 39.2 | — | 40.2 | — | 6.2 | 14.4 | — |
| | weight % | 43.23 | — | 46.62 | — | 1.32 | 8.83 | — |
| Fe—Ni—B | atom % | 40 | — | 40 | — | 20 | — | — |
| | weight % | 46.6 | — | 48.9 | — | 4.5 | — | — |
| Fe—B | atom % | 79.7 | — | — | — | 20.3 | — | — |
| | weight % | 95.38 | — | — | — | 4.62 | — | — |
| Fe—Mo—B | atom % | 77.5 | — | — | 2.5 | 20 | — | — |
| | weight % | 90.47 | — | — | 5.01 | 4.52 | — | — |
| Co—Fe—Mo—B—Si | atom % | 5.5 | 67.5 | — | 2 | 12 | — | 13 |
| | weight % | 6.19 | 80 | — | 3.86 | 2.61 | — | 7.34 |

Examples of amorphous metallic alloy that have been found unsuitable for use as a magnetic theft detection system marker are set forth in Table II below:

TABLE II

| | Composition Percent | | | | | | | | | | | |
|---|---|---|---|---|---|---|---|---|---|---|---|---|
| | Ni | Cr | B | Si | Fe | C | P | S | Al | Ti | Zr | CO |
| Atom % | 71.67 | 5.75 | 12.68 | 7.10 | 2.23 | .25 | .032 | .031 | .093 | .052 | .027 | .085 |
| Weight % | 84.40 | 6 | 2.75 | 4 | 2.5 | .06 | .02 | .02 | .05 | .05 | .05 | .1 |
| Atom % | 65.63 | 11.55 | 11.58 | 7.13 | 3.14 | .12 | — | — | — | — | — | .85 |
| Weight % | 76.97 | 12.0 | 2.5 | 4 | 3.5 | .03 | — | — | — | — | — | 1.0 |

The amorphous ferromagnetic metal marker of the invention is prepared by cooling a melt of the desired composition at a rate of at least about $10^5$° C./sec, employing metal alloy quenching techniques well-known to the glassy metal alloy art; see, e.g., U.S. Pat. No. 3,856,513 to Chen et al. The purity of all compositions is that found in normal commercial practice.

A variety of techniques are available for fabricating continuous ribbon, wire, sheet, etc. Typically, a particular composition is selected, powders or granules of the requisite elements in the desired portions are melted and homogenized, and the molten alloy is rapidly quenched on a chill surface, such as a rapidly rotating metal cylinder.

Under these quenching conditions, a metastable, homogeneous, ductile material is obtained. The metastable material may be glassy, in which case there is no long-range order. X-ray diffraction patterns of glassy metal alloys show only a diffuse halo, similar to that observed for inorganic oxide glasses. Such glassy alloys must be at least 50% glassy to be sufficiently ductile to permit subsequent handling, such as stamping complex marker shapes from ribbons of the alloys without degradation of the marker's signal identity. Preferably, the glassy metal marker must be at least 80% glassy to attain superior ductility.

The metastable phase may also be a solid solution of the constituent elements. In the case of the marker of the invention, such metastable, solid solution phases are not ordinarily produced under conventional processing techniques employed in the art of fabricating crystalline alloys. X-ray diffraction patterns of the solid solution alloys show the sharp diffraction peaks characteristic of crystalline alloys, with some broadening of the peaks due to desired fine-grained size of crystallites. Such metastable materials are also ductile when produced under the conditions described above.

The marker of the invention is advantageously produced in foil (or ribbon) form, and may be used in theft detection applications as cast, whether the material is glassy or a solid solution. Alternatively, foils of glassy metal alloys may be heat treated to obtain a crystalline phase, preferably fine-grained, in order to promote longer die life when stamping of complex marker shapes is contemplated. Markers having partially crystalline, partially glassy phases are particularly suited to be desensitized by a deactivation system 38 of the type shown in FIG. 2. Totally amorphous ferromagnetic marker strips can be provided with one or more small magnetizable elements 44. Such elements 44 are made of crystalline regions of ferromagnetic material having a higher coercivity than that possessed by the strip 18. More-over, totally amorphous marker strip can be spot welded, heat treated with coherent or incoherent radiation, charged particle beams, directed flames, heated wires or the like to provide the strip with magnetizable elements 44 that are integral therewith. Further, such elements 44 can be integrated with strip 18 during casting thereof by selectively altering the cooling rate of the strip 18. Cooling rate alteration can be effected by quenching the alloy on a chill surface that is slotted or contains heated portions adapted to allow partial crystallization during quenching. Alternatively, alloys can be selected that partially crystallize during casting. The ribbon thickness can be varied during casting to produce crystalline regions over a portion of strip 18.

Upon permanent magnetization of the elements 44, their permeability is substantially decreased. The magnetic fields associated with such magnetization bias the strip 18 and thereby alter its response to the magnetic field extant in the interrogation zone 12. In the activated mode, the strip 18 is unbiased with the result that the high permeability state of strip 18 has a pronounced effect upon the magnetic field applied thereto by field generating means 14. The marker 16 is deactivated by magnetizing elements 44 to decrease the effective permeability of the strip 18. The reduction in permeability significantly decreases the effect of the marker 16 on the magnetic field, whereby the marker 16 loses its signal identity (e.g., marker 16 is less able to distort or reshape the field). Under these conditions, the protected articles 19 can pass through interrogation zone 12 without triggering alarm 28.

The amorphous ferromagnetic marker of the present invention is exceedingly ductile. By ductile is meant that the strip 18 can be bent to a round radius as small as ten times the foil thickness without fracture. Such bending of the marker produces little or no degradation in magnetic harmonics generated by the marker upon application of the interrogating magnetic field thereto. As a result, the marker retains its signal identity despite being flexed or bent during (1) manufacture (e.g., cutting, stamping or otherwise forming the strip 18 into the desired length and configuration) and, optionally, applying hard magnetic chips thereto to produce an on/-off marker, (2) application of the marker 16 to the protected articles 19, (3) handling of the articles 19 by employees and customers and (4) attempts at signal destruction designed to circumvent the system 10.

Generation of harmonics by marker 16 is caused by nonlinear magnetization response of the marker 16 to an incident magnetic field. High permeability—low coercive force material such as Permalloy, Supermalloy and the like produce such nonlinear response in an amplitude region of the incident field wherein the magnetic field strength is sufficiently great to saturate the material. Amorphous ferromagnetic materials have nonlinear magnetization response over a significantly greater amplitude region ranging from relatively low magnetic fields to higher magnetic field values approaching saturation. The additional amplitude region of nonlinear magnetization response possessed by amorphous ferromagnetic materials increases the magnitude of harmonics generated by, and hence the signal strength of, marker 16. This feature permits use of lower magnetic fields, eliminates false alarms and improves detection reliability of the system 10.

The following examples are presented to provide a more complete understanding of the invention. The specific techniques, conditions, materials and reported data set forth to illustrate the principles and practice of the invention are exemplary and should not be construed as limiting the scope of the invention.

EXAMPLE 1

Elongated strips of ferromagnetic material were tested in Gaylord-Magnavox Security System #MX 526 C. The composition and dimension of the strips were as follows:

| Strip # | Composition (Atom %) | Dimensions (Cm) | Material |
|---|---|---|---|
| 1 | $Fe_{40}Ni_{40}Mo_2B_{18}$ | 10.2 × .318 | Amorphous |
| 2 | $(Co_{92.5}Fe_{2.5})_{73}Mo_2B_{12}Si_{13}$ | 10.2 × .318 | Amorphous |
| 3 | $Fe_{81}C_2Si_{4.5}B_{12}$ | 10.2 × .318 | Amorphous |
| 4 | $Fe_{40}Ni_{40}B_{20}$ | 10.2 × .135 | Amorphous |
| 5 | Conetic Permalloy | — | Crystalline |

The Gaylord-Magnavox system applied, within an interrogation zone 12, a magnetic field that increased from 0.08 Oersted at the center of the zone to 0.2 Oersted in the vicinity of interior walls of the zone. The security system was operated at a frequency of 8 KHz.

Each of strips 1-5 were twice passed through the security system interrogation zone parallel to the walls thereof. The strips were then flexed to produce a degraded condition and passed through the interrogation zone 12 as before. The results of the example are tabulated below.

| Strip # | Condition of Material | Activated Alarm |
|---|---|---|
| 1 | before bending | yes |
| | after bending | yes |
| 2 | before bending | yes |
| | after bending | yes |
| 3 | before bending | yes |
| | after bending | yes |
| 4 | before bending | yes |
| | after bending | yes |
| 5 | before bending | yes |
| | after bending | no |

Having thus described the invention in rather full detail it will be understood that these details need not be strictly adhered to but that further changes and modifications may suggest themselves to one having ordinary skill in the art, all falling within the scope of the invention as defined by the subjoined claims.

What is claimed is:

1. For use in a magnetic theft detection system, a marker adapted to generate magnetic fields at frequencies that are harmonically related to an incident magnetic field applied within an interrogation zone and have selected tones that provide said marker with signal identity, said marker being an elongated, ductile strip of amorphous ferromagnetic material and retaining its signal identity after being flexed or bent.

2. A marker as recited in claim 1, said marker having at least one magnetizable portion integral therewith, the magnetizable portion having coercivity higher than that of said amorphous material.

3. A marker as recited in claim 2, wherein said magnetizable portion is adapted to be magnetized to bias said strip and thereby decreases the amplitude of the magnetic fields generated by said marker.

4. A marker as recited in claim 2, wherein said magnetizable portion comprises a crystalline region of said material.

5. A marker as recited in claim 3, wherein said decrease in amplitude of magnetic fields generated by said marker causes said marker to lose its signal identity.

6. In a magnetic theft detection system marker for generating magnetic fields at frequencies that are harmonically related to an incident magnetic field applied within an interrogation zone and have selected tones that provide said marker with signal identity, the improvement wherein:

a. said marker is an elongated, ductile strip of amorphous ferromagnetic material;

b. said marker retains its signal identity after being flexed or bent.

7. A magnetic detection system responsive to the presence of an article within an interrogation zone, comprising:

a. means for defining an interrogation zone;

b. means for generating a magnetic field within said interrogation zone;

c. a marker secured to an article appointed for passage through said interrogation zone, said marker being an elongated, ductile strip of amorphous ferromagnetic metal capable of producing magnetic fields at frequencies which are harmonics of the frequency of an incident field;

d. detecting means for detecting magnetic field variations at selected tones of said harmonics produced in the vicinity of the interrogation zone by the presence of the marker therewithin, said selected tones providing said marker with signal identity and said marker retaining said signal identity after being flexed or bent.

*8. A marker as recited in claim 1, said marker comprising at least one crystalline phase and at least one amorphous phase.*

*9. A marker as recited in claim 1, said marker comprising an amorphous ferromagnetic strip provided with at least one magnetizable element.*

*10. A marker as recited in claim 9, said marker comprising a plurality of hard magnetic chips.*

*11. A marker as recited in claim 10, said marker comprising an ordered pattern of said plurality of hard magnetic chips.*

*12. A marker as recited in claim 11, said marker comprising at least one ordered row of said plurality of hard magnetic chips.*

*13. A marker as recited in claim 1, said marker comprising an at least 50% glassy ferromagnetic alloy of such ductility as to permit flexing or bending without degradation of the signal identity thereof.*

*14. A marker as recited in claim 13, said marker comprising an at least 80% glassy ferromagnetic alloy of such ductility as to permit flexing or bending without degradation of the signal identity thereof.*

*15. A marker as recited in claim 14, said marker comprising an amorphous ferromagnetic foil adapted to be bent to a round radius, without fracture, as small as ten times the foil thickness thereof.*

*16. A marker as recited in claim 1, said marker comprising a solid solution of said amorphous ferromagnetic material.*

*17. A marker as recited in claim 1, said marker comprising a ribbon or foil, wire, or sheet.*

*18. A marker as recited in claim 17, said marker comprising a ribbon or foil.*

*19. A marker as recited in claim 17, said marker comprising a wire.*

*20. A marker as recited in claim 17, said marker comprising a sheet.*

*21. An article of merchandise having an amorphous antipilferage marker secured thereto, said marker comprising that as recited in claim 1.*

*22. An article of merchandise as recited in claim 21, comprising book, wearing apparel or appliance.*

* * * * *